Sept. 11, 1934.  H. R. NORTON  1,973,096
ELEVATOR DISPATCHING SYSTEM
Filed Sept. 9, 1925   5 Sheets-Sheet 1

H. R. NORTON.
BY Newell & Spencer
ATTORNEYS

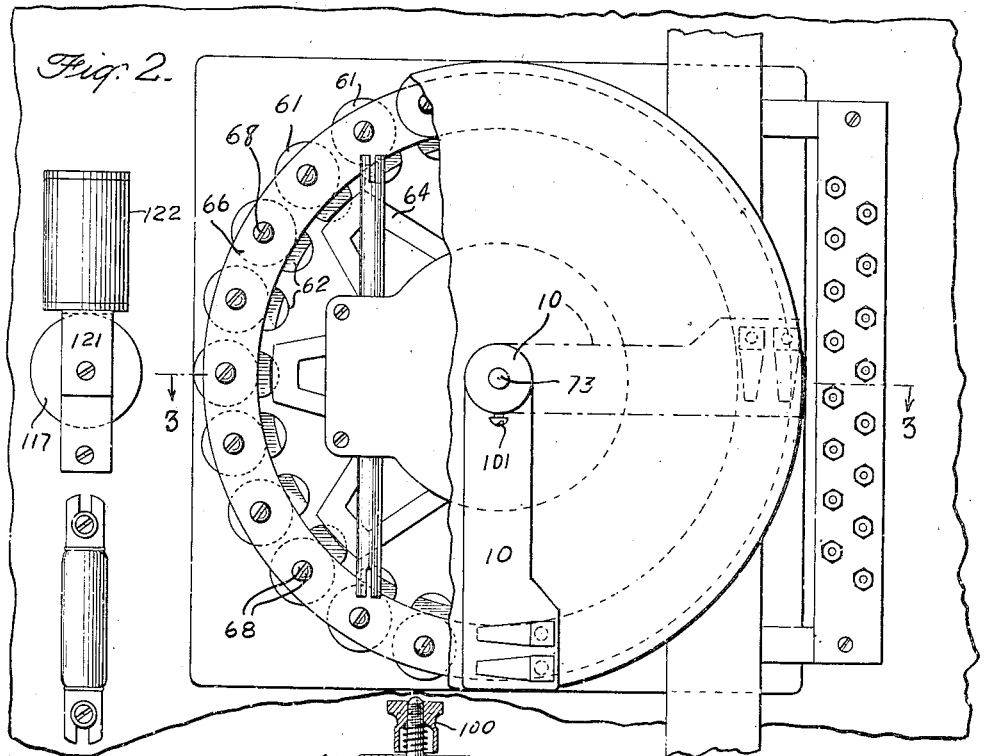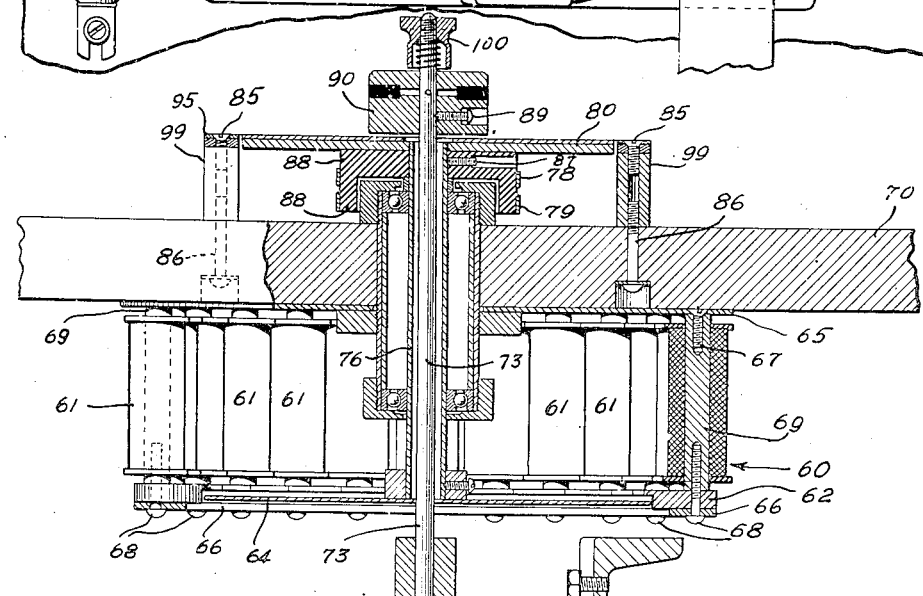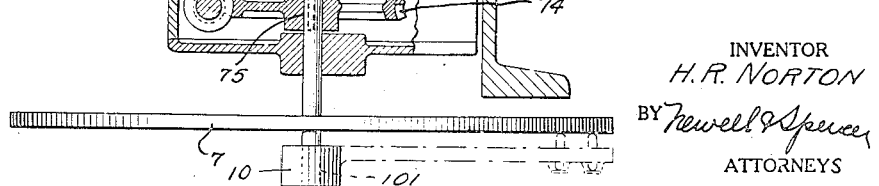

Sept. 11, 1934.   H. R. NORTON   1,973,096
ELEVATOR DISPATCHING SYSTEM
Filed Sept. 9, 1925   5 Sheets-Sheet 3
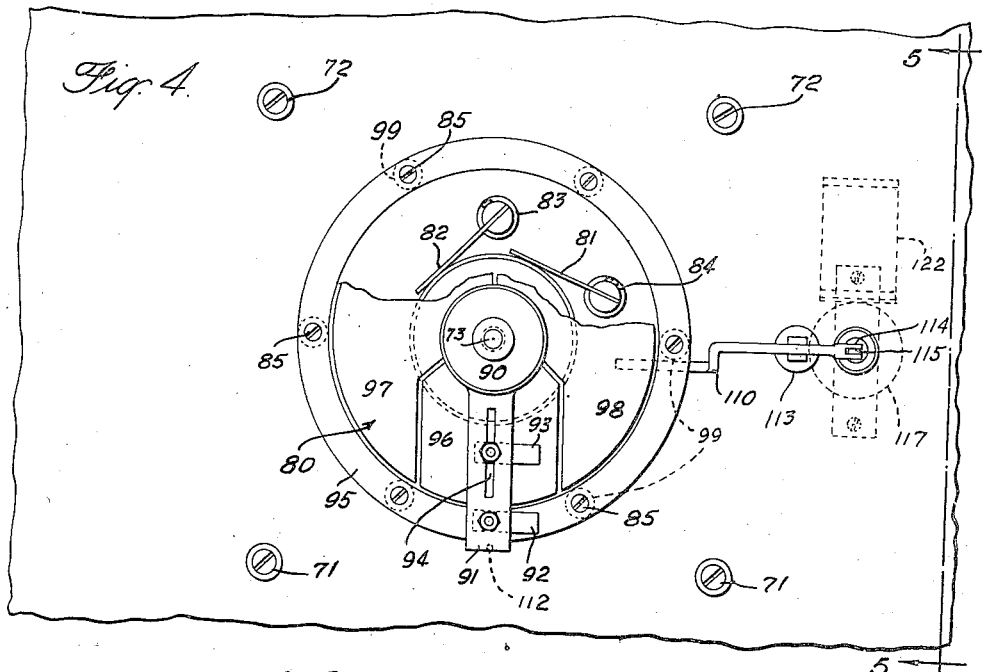
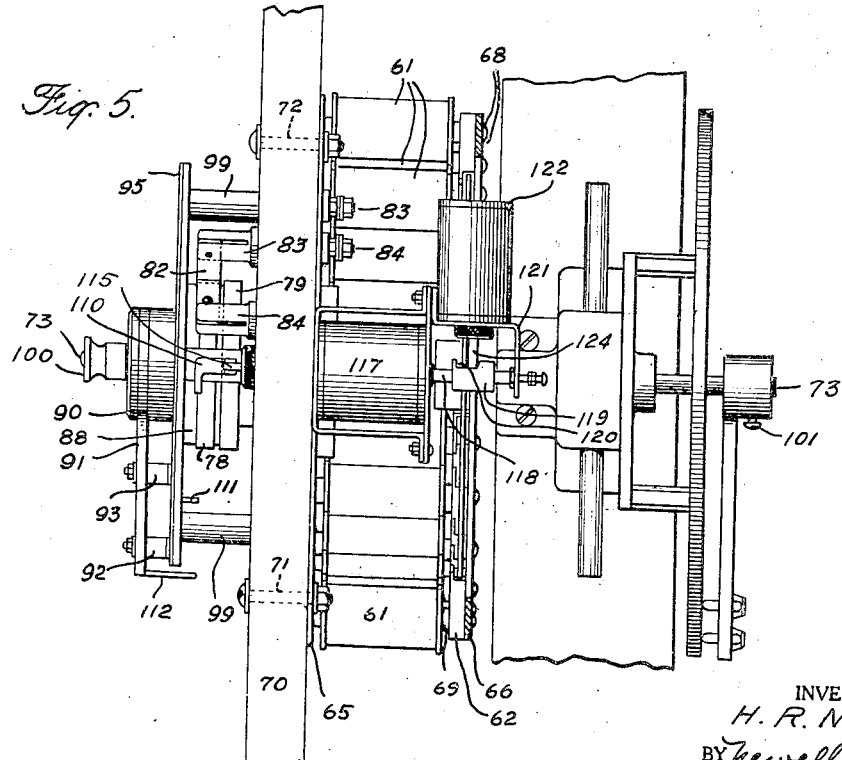
INVENTOR
H. R. NORTON
BY Newell & Spence
ATTORNEYS Sept. 11, 1934.                H. R. NORTON                1,973,096
                        ELEVATOR DISPATCHING SYSTEM
                    Filed Sept. 9, 1925      5 Sheets-Sheet 5
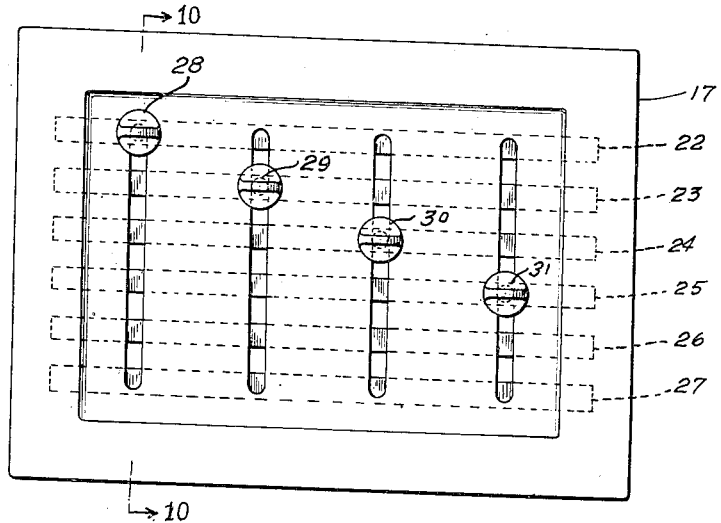
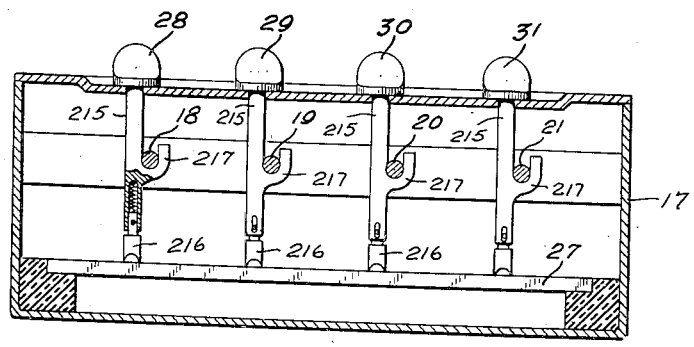
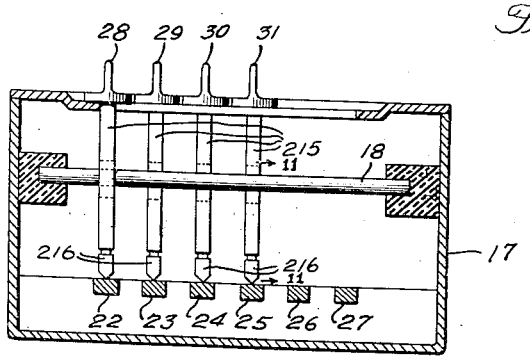
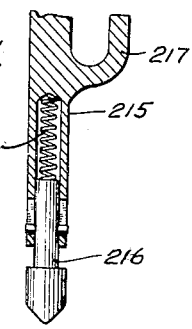
INVENTOR
H. R. NORTON.
BY *Newell & Spencer*
ATTORNEYS Patented Sept. 11, 1934

1,973,096

UNITED STATES PATENT OFFICE 1,973,096

ELEVATOR DISPATCHING SYSTEM

Harry R. Norton, New York, N. Y., assignor, by mesne assignments, to Westinghouse Electric Elevator Company, Chicago, Ill., a corporation of Illinois Application September 9, 1925, Serial No. 55,254

6 Claims. (Cl. 177—336)

This invention relates to elevator dispatching systems and particularly to automatic dispatching systems for use in buildings having a large number of elevators and considerable traffic.

It is the object of this invention to provide a system in which cars may be dispatched automatically under the supervision of one attendant so that he may know at any particular instant the position and condition of every car.

An arrangement whereby cars may be spaced apart at any desired interval is one of the features of the invention.

Another feature is the provision of means for informing the operator of each car whether he is running ahead or behind the predetermined schedule.

A still further feature resides in that when a car falls behind, its signal-receiving equipment is automatically disabled until it again resumes its schedule.

Other novel features may be found in the apparatus and circuit arrangements involved in the accomplishment of these objects, as will become evident as this description progresses.

In the drawings, Fig. 1 represents a schematic diagram of a complete dispatching system, in accordance with the invention;

Fig. 2 is a front view, partly broken away, of the timing unit, showing the location and arrangement of the magnets;

Fig. 3 is a section on the line 3—3 of Fig. 2;

Fig. 4 is a front view showing the commutator and brushes mounted on the front of the device shown in Fig. 2;

Fig. 5 is a section along the line 5—5 of Fig. 4;

Fig. 8 is a plan view of the car signalling rack.

Fig. 9 is a front sectional view thereof.

Fig. 10 is a section on line 10—10 of Fig. 8, and

Fig. 11 is a section on the line 11—11 of Fig. 10.

Figure 1:
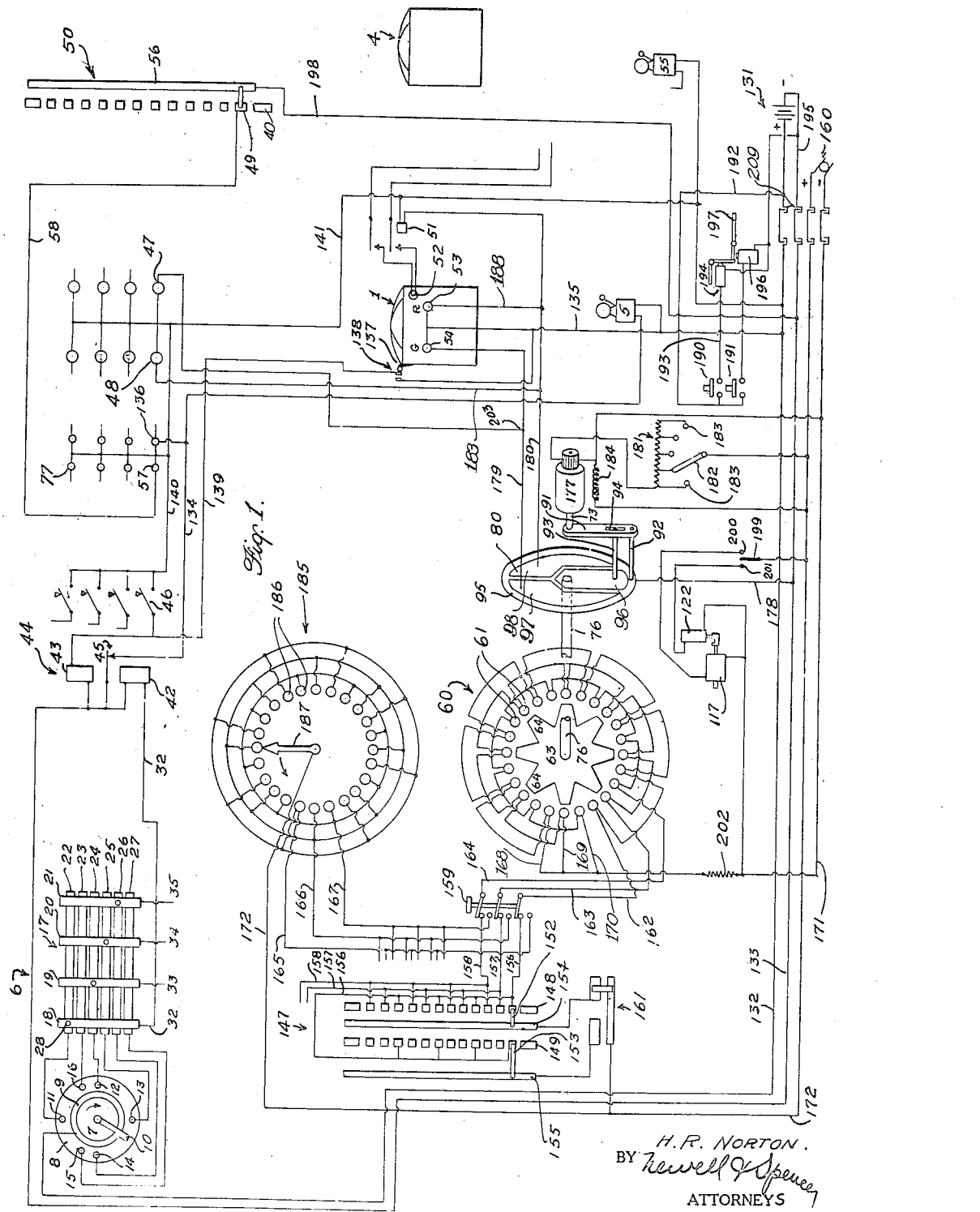

Referring to Fig. 1, there is shown a schematic layout of the circuits and equipment necessary for one car only, since it is obvious that for additional cars the equipment need merely be duplicated. Each car is equipped, in addition to its usual signalling-receiving equipment 52 for car 1, with two signals, one designated 53 to denote that the car is running behind its schedule and the other 54 to denote that the car is ahead of schedule.

The dispatching system of this invention comprises starting equipment, represented generally at 6, which is common to a bank of cars of which car 1 is a unit. This equipment consists of two adjustable contact-making devices, which are adapted to close circuits to individual car starting signals 5 at certain predetermined intervals. By means of these devices any number of cars may be automatically signalled in succession in any order at any desired interval, which interval may be varied at will.

A circular disk commutator 7 comprising an outer strip 8 and an inner strip 9 is traversed by a constant speed revolving brush arm 10 which carries two brushes adapted to make bridging contact between strips 8 and 9. The outer strip 8 has series of evenly spaced contacts 11, 12, 13 and 14, being one series of four contacts 90° apart, and 13, 15 and 16 being another series 120° apart. Any desired number of separate series may be provided depending upon the number of cars in one bank to be dispatched. Each of these contacts is connected by suitable wires to one of the lower group of contact bars on car spacing rack 17.

Rack 17 (Figs. 8-11 incl.) consists of two groups of parallel bars, the bars in one group being at right angles with and mounted in a plane above the bars in the other. Cross connection between a bar 18 in one group may be made with any bar in the other group 22–27 by means of connectors 28–31 which are slidably mounted on the upper bars 18–21, and project downward to contact with any lower bar. Proper contact between the connectors and the bars may be assured by constructing the former as shown in Fig. 11. A hollow metal rod 215 is adapted for the insertion of a slidable conducting peg 216 which makes rubbing contact with the lower bars 22–27 incl. A rounded projection 217 on rod 215 engages the under side of one of the bars 18–21 incl. Pressure sufficient to effect good contact between peg 216 and the bar and projection 217 and its bar is maintained by means of spring 218 located in the hollow portion of rod 215 above peg 216. The upper bars of rack 17, being individual to the cars, are each connected by a suitable wire 32 to 35 to the operate magnet 42 of a mechanically locking relay 44 preferably of the mercury pot type, as shown in U. S. Patent #1,134,448 issued April 6, 1915 to R. H. Gaylord.

Relay 44 controls at its contact the operation of the starting signal 5, 55 etc. and the lighting of the corresponding starting indicating lamp 136 etc. at the dispatching position.

The interval at which signals 5, 55, etc. are operated and the number and sequence of cars to be dispatched may be controlled from starting mechanism 6. Suppose it is desired to dispatch four cars of a bank in order 1, 2, 3, 4 at regular intervals. That means that leads 32, 33, 34, 35 must be connected so that magnets 42 for the cars will be operated in regular order. Since the impulses of current are controlled by means of disk 7 and its cooperating brush arm 10, it is evident that contact must be made at each quarter revolution of the brushes.

Brush arm 10 is arranged to revolve in a clockwise direction at any desired constant speed, bridging between the continuous or feed disk 9 and the segmented disk 8. The latter has distributed at regular intervals series of contact devices 11, 12, 13 and 14, and 16, 13 and 15 embedded in insulating material, so that whenever brush 10 bridges across one of these contact devices and feed strip 9, current is supplied by suitable conductors to one of the lower cross bars on rack 17.

For instance, contact 11 is connected to cross bar 22, contact 12 with bar 24, 13 with 25, and 14 with 26. Therefore, these cross bars are rendered alive in that order, as brush 10 rotates in a clockwise direction.

This current may then be supplied to the starting signals of the four cars in any desired order by connecting each of the upper cross bars 18, 19, 20 and 21 to the proper lower cross bar. This is done simply by moving sliders 28 to 31, inclusive, along bars 18 to 21, inclusive, until they contact with the proper bars 22 to 27, inclusive.

In the case assumed,—four cars started in the order 1, 2, 3, 4—bar 18 is connected to 22, 19 to 24, 20 to 25, and 21 to 26. Any other cross connection may be made as desired. For instance, if the cars are to start in the order 4, 3, 2, 1, bar 22 should be connected to 21, 24 to 20, 25 to 19, and 26 to 18. The number of permutations may be figured out according to the well-known mathematical formula.

The number of cars operating in any bank may be changed and the remaining cars started at regular intervals in a very simple manner. Suppose car 4 is taken out of service and it is desired to operate cars 1, 2 and 3 at regular intervals in the order named. Impulses should then be given to the signals of the cars every third revolution of brush 10. Contacts 16, 13 and 8, 120° apart, being connected to cross bars 23, 25 and 27, respectively, should be cross connected to the upper bars in the following manner: 23 to 18, 25 to 19, and 27 to 20. The slide 31 for car 4 is moved out of contact with any bars since car 4 is not to be signalled. Any other car or cars may be disconnected in this manner.

The interval between starting the cars may be varied by merely varying the speed at which brush 10 revolves about the disk 7.

In order to keep the cars running at regular intervals in response to the starting signals, it is advisable to provide some means of letting the operators and dispatchers know when the cars are running on schedule speed, so that they may be at the ground floor when the starting signal is given.

This information is given as above explained by means of two signal lamps for each car duplicated at the dispatching position, one to denote that the car is ahead of schedule and one to denote that it is behind schedule. Distinctive colors may be assigned to these lamps, e. g. green denoting ahead of schedule and red behind schedule. When the car is traveling on schedule, both lamps will be extinguished.

The mechanism and circuits for accomplishing this result will now be described.

A step-by-step motor 60, one being provided for each car, drives, in response to the motion of the car, a disk commutator 80. This motor, as is better seen in Figs. 2, 3 and 5, comprises a series of electromagnets 61 mounted at equal distances about the circumference of a circle and arranged in a desired number of groups of series-connected magnets. Each magnet has a projecting pole piece 62, arcuate in form, to permit an armature 63 having a number of starlike projections 64, equal to the number of magnets in a group, to revolve step by step.

The group of magnets 61 are mounted between two flat rings 65 and 66 by means of screws or bolts 67 and 68, individual to each magnet. Supporting pieces 69 tend to strengthen the rings 65 and 66. The whole is then secured to a panel 70 by suitable bolts 71 and 72. Extending through the center of the circle of magnets and through an opening in the panel 70 is a shaft 73 which may be rotatably driven at a constant speed by means of gear or pulley mechanism 74 keyed to the shaft at 75.

Freely rotatable on shaft 73 is a second shaft 76 which carries, suitably secured thereto, armature 64. Threaded on shaft 76 and rotating therewith, is a mounting 88 carrying two slip rings 78 and 79 for a purpose hereinafter set forth. The mounting 88 is keyed to the shaft 76 by a screw 87. Cooperating brushes 81 and 82 are mounted respectively on studs 83 and 84, which also act as terminal posts for said brushes.

A commutator disk 80 is frictionally mounted on the shaft 76 adjacent to the mounting 88. Securely fastened to shaft 73 by screw 89 is a brush carrier 90, which has an extending arm 91, having secured thereto two brushes, 92 at its outer edge to contact with outer ring 95, and 93 adjustably mounted in a slot 94 so as to permit contact with any portion of segments 96, 97 and 98.

Outer ring 95 being a feed strip is stationary and is secured to panel 70 by means of studs 99 and screws 85 and 86.

A spring cap 100 screws over the end of shaft 73 and maintains proper tension on brushes 92 and 93 by bearing upon carrier 90.

It will be noted that, for convenience, car-starting disk 7 is mounted behind the panel 70 in association with the timing device for one car. The same motor which drives shaft 73 may be then employed to drive the brush arm 10, as there is a definite relationship between the speed of brush arm 10 and brushes 92 and 93. The brush arm 10 is keyed to shaft 73 at 101 and rotates therewith.

As will become evident as the description of operation progresses, it is necessary that disk 80 and brush arm 91 rotate in substantial synchronism. It is therefore important that means be provided to start them rotating in a definite relative position. Such means comprises a lever 110 which is adapted to engage a projecting stud 111 on segment 96 of disk 80, and a stud 112 on brush arm 91.

Lever 110 is pivoted on a support 113 mounted on the front of panel 70. The other end of the lever is suitably hinged at 114 to a driving rod 115, which extends through the panel and is rigidly secured to the plunger 116 of a solenoid 117. Energization of solenoid 117 attracts plunger 116 and rod 115, with the result that lever 110 pivoted at 113 is lifted into a position to engage both studs 111 and 112 as they revolve.

Because of the frictional mounting of disk 80 on armature 64 and of brush arm 91 on shaft 73, the disk and arm will remain stationary while their respective driving members are active.

Upon release of magnet 117, plunger 116 moves forward causing lever 110 to disengage studs 111 and 112, and brush arm 91 and disk 80 start revolving in synchronism. In order to insure that lever 110 will remain engaged, a locking arrangement is provided. Plunger 116 is extended rearwardly in a shaft 118, upon which is securely mounted a solid cylindrical member 119 having a groove 120 in the upper portion of its surface. Suitably mounted on a supporting frame 121, at right angles to solenoid 117, is another solenoid 122 of well-known construction, having a plunger 123 whose extremity 124 rests on the upper surface of member 119. Whenever plunger 116 is attracted by solenoid 117, member 119 moves into such a position that member 124, due to the force of gravity, falls into groove 120, thus holding the plunger 116, and consequently lever 110, in its operated position. In order, therefore, to release lever 110, it is necessary to energize solenoid 122, thus disengaging member 124 from groove 120. A spiral spring 125 may be provided on shaft 118 between support 121 and collar 126 to aid the return of solenoid plunger 116 to its normal position.

Returning now to Fig. 1, a description of the operation of the system will more clearly indicate the purpose of the herein described apparatus.

A dispatcher desiring to run a bank of four cars in a certain order and at a predetermined schedule speed, manipulates rack 17 so that the cross connections are as shown in Fig. 1. Brush holder 10 then revolves in a clockwise direction, making contact between strip 9 and the metallic portions 11, 12, 13 and 14 of strip 8. As the brush bridges contact 11, magnet 42 operates causing armature 45 to close its mechanically locking contact, thereupon causing starting signal 5 to ring. Gong 5 will thus continue to ring until either car 1 leaves the ground floor or the dispatcher presses his starting signal cut-out button 46. As soon as the car leaves the floor, a contact closer 137 carried by the car causes a pair of contacts 138 to close, completing an obvious circuit for restoring magnet 43 over conductor 139 breaking the circuit of signal 5; a group of keys 46 at the dispatcher's position permits the dispatcher to cut off the starting signal whenever desired.

Brush arm 10, in wiping over contact 16, performs no useful service at this time since bar 23 is disconnected from any of the upper cross bars 18 to 21, inclusive. But upon reaching contact 12 connected to bar 24, brush 10 completes a circuit to cross bar 19, which is connected to the signal controlling magnet of the second car. In the same manner as for car 1, signal 55 of car 2 is operated. Contact between brushes of arm 10 and contacts 13 and 14, a quarter of a revolution later respectively, causes the gongs of cars 3 and 4, to ring and the cycle is repeated. It is thus seen that the cars will be started regularly at equal intervals, the length of the intervals depending upon the speed of brush arm 10, which may be altered to any desired value by changing the speed of the driving motor, as will be more fully set forth.

It is evident of course that the starting signals for the cars will function at the proper time, whether or not the associated car is at the ground floor. In order that the car may be ready to leave the floor upon the ringing of the gong, a timing device, as hereinbefore described, is provided for each car. An auxiliary commutator 147, comprising up and down strips 148 and 149 having two car-controlled brushes 152 and 153, makes contact between the segment of strips 148 and 149 and feed strips 154 and 155 as the car passes from floor to floor. Each segmented strip contains a number of segments equal to the number of floors traversed. These segments are multiplied to three feed wires 156, 157 and 158 leading to three positive transfer switches 159, as will presently be described. It will be observed in the case of a twelve floor building, as shown herein for convenience, that lead 156 is connected to the 1st, 4th, 7th and 10th segments of the up strip, and the 12th, 9th, 6th and 3rd segments of the down strip. Conductors 157 and 158 are similarly connected to every third segment. It is obvious that any other desired wiring may be employed. In this manner, when brush 152 on the up trip and brush 153 on the down trip pass over each segment, positive potential as supplied strips 154 or 155 from source 160 is connected to each segment in turn, and as a consequence to each conductor 156, 157 and 158 in turn.

A frictionally operated reversing switch 161 is interposed between source 160 and commutator strips 154 and 155, so that these strips will be alternately energized under the control of the associated car, strip 154 being energized upon the up trip and 155 on the down trip. For a description of this reversing switch see U. S. Patent #1,108,782 issued Aug. 25, 1914 to F. S. Payne.

The upper contacts of transfer switch 159 are connected by means of conductors 162, 163 and 164, each to a group of series magnets of motor 60, the current through the magnets being led out over conductors 168, 169 and 170 in parallel to the negative side of source 160 over conductor 171.

Figure 7:
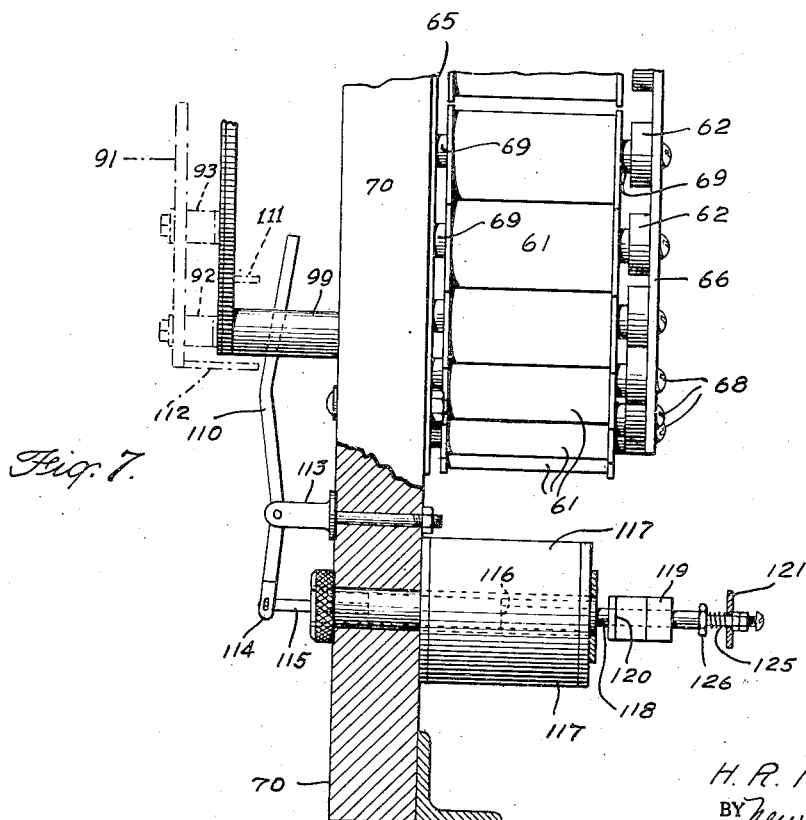
Fig. 7 is another view of the magnet of Fig. 6.

With the transfer switch in the upper position and brush 152 passing over the segments of strip 148, three circuits will be alternately made and broken from source 160 over conductor 172, through the contacts of reversing switch 161, feed strip 154, brush 152, segments of strip 148, conductors 156, 157 and 158, upper contacts of switch 159, conductors 162, 163, and 164, through the proper group of magnets in series, conductors 168, 169 and 170, to the other side of source 160 over conductor 171. Alternate energization of the magnets will cause armature 63 to rotate step by step in synchronism with the car. Commutator 80, comprising a metal plate having the three segments, 96, 97 and 98, is frictionally mounted on shaft 76, which is driven by armature 63 and rotates therewith, unless held stationary by lever 110 (Fig. 7), as will hereinafter appear. Independently driven by motor 177, in the same direction as commutator 80, are brushes 92 and 93, as hereinbefore described. Brush 93 is in contact with commutator 80 while brush 92 contacts with stationary feed ring 95, which is connected by means of conductors 178 and 133 to the negative side of battery 131.

Segment 97 of commutator 80 is connected over conductor 179 to "car ahead" signal 54 in car 1 and over conductors 179 and 203 to "car ahead" signal 47 at the dispatching position, and segment 98 is connected by conductors 180 and 183 to "car behind" signal 48 at the dispatching position, and through conductors 180 and 188 to the "car behind" signal 53 in car 1 and also through conductor 180 to one side of a relay 51, which is arranged at its contacts to open the signal receiving circuits of the car whenever it falls behind its schedule.

The speed of brushes 92 and 93 may be set at any desired value by merely changing the speed of motor 177. A rheostat 181 in the armature circuit of the motor, or in the field 184, if desired, may be adjusted by means of contact arm 182 and contacts 183, thus increasing or decreasing the motor speed in the well-known manner.

As long as the speed of commutator 80 remains substantially equal to that of the brushes 92 and 93, the car is running on schedule and no indications will be given, since segment 96, with which brush 93 is in contact, is an open or dead segment. As soon, however, as commutator 80 either runs ahead or falls behind the brushes, brush 93 contacts with either segment 97 or segment 98, these segments being "live" due to electrical connection with slip rings 78 and 79 and cooperating brushes 81 and 82 respectively, and the proper indication will be given. It is to be noted that brush 93 is adjustable towards or away from the centre of commutator 80 so that there is provided a little leeway as to the time when the signals are to be given.

For each bank of cars there is also provided a disk locator 185, adapted to operate step-motor 60 independently of the travel of the car, comprising a series of contacts 186 arranged in a circle with contact arm 187 pivoted at the center of the circle and adapted to make contact with each of said contacts in turn. Lever 187 is connected by conductor 172 to the positive side of source 160. The contacts 186 are connected in three parallel groups of eight each, corresponding in number and grouping to the magnets 61, each contact of each group being adjacent a contact of each of the other groups. By means of conductors 165, 166 and 167 the three groups are connected to the lower contacts of transfer switch 159, and by means of suitable multiple leads to the transfer switches of the other cars in the bank. By operating transfer switch 159 and moving contact arm 187 progressively from contact to contact in the direction of the arrow, magnets 61 may be progressively energized in the same manner as when brushes 152 and 153, which are also connected to conductor 172, make and break contact with the segments of strips 148 and 149, as hereinbefore mentioned.

The arm 187 is used in conjunction with stop magnet 117 to position disk 80 and brushes 92 and 93 with respect to each other before starting the regular dispatching of a bank of cars. In this respect it is similar in operation to auxiliary commutator 147.

A brief description of the operation of the system will give a better understanding of its importance. With all the cars in the bank at the ground floor, it is necessary before starting any of the cars to momentarily operate remote control switch button 190. A circuit is then closed from the positive side of battery 131, conductor 192, contacts of switch 190, conductor 193, operating magnet 194 of switch 197 to the negative side of battery over conductor 195. Magnet 194 in attracting its armature permits the contacts of switch 197 to fall into the mercury pots 209, thus connecting battery to conductors 132 and 133 and source 160 to conductors 171 and 172. Switch 197 remains operated until button 191 is pressed, which operates magnet 196, causing it to withdraw the contacts from the mercury pots. Since car 1 is standing at the ground floor, car-controlled brush 40 will be in engagement with segment 49 of the commutator 50. Lamp 57 is illuminated in a circuit which may be traced from the positive side of battery 131, contacts of switch 197, conductors 132, 141 and 140, lamp 57 at the dispatching position, conductor 58, segment 49, brush 40, feed strips 56, conductors 198 and 133, contact switch 197, conductor 195 to the negative side of battery 131. Similarly lamp 77 is illuminated for car 4.

Motor 177 is then started in the usual manner and its speed set at the desired value by means of arm 182. The desired order of starting and the number of cars to be controlled is determined for setting apparatus 17, as hereinbefore explained.

It is necessary now to line up disk 80 and brushes 92 and 93 in order that the "car behind" and "ahead" signals may properly function. As is apparent, brush arm 91 is rotating continuously while motor 177 is energized, but disk 80 only rotates in response to motion of the car or by operation of apparatus 185 as set forth above.

The dispatcher then operates switch 199 to close contact 200, whereupon a circuit is completed from source 160, conductor 171, magnet 117, contact 200, switch 199 to the other side of source 160, over conductor 172. Lever 110 is moved into its engaging position and, when projection 112 on brush arm 91 engages lever 110, the brushes are held from rotating but motor 177 continues to revolve due to the frictional mounting of brush arm 91 on shaft 73. Disk 80 is then brought into proper relation with the brushes by stepping it around by means of apparatus 185 until its projection 111 engages lever 110. The despatcher depresses transfer switch 159, thus disconnecting magnets 61 from auxiliary commutator 147 and connecting them by means of conductors 165, 166 and 167 to contacts 186. Arm 187 is then moved by the starter from contact to contact in a counter-clockwise direction, completing a circuit upon each step from the positive side of source 160 over conductor 172, arm 187, contact 186, each one of conductors 165, 166 and 167 in succession, lower contacts of switch 159 through each series of eight magnets 61 in succession, conductors 168, 169 or 170, resistance 202 to the other side of source 160 over conductor 171. Armature 63, and in consequence commutator 80, is stepped in a counter-clockwise direction until projection 111 strikes lever 110, where it comes to rest, due to its frictional mounting on shaft 76. Switch 159 is then released and brushes 92 and 93 and commutator 80 remain stationary. The commutators and brushes of the timing devices 60 for each car are brought into synchronism in turn by means of locator 185 and the proper transfer switch 159.

Figure 6:
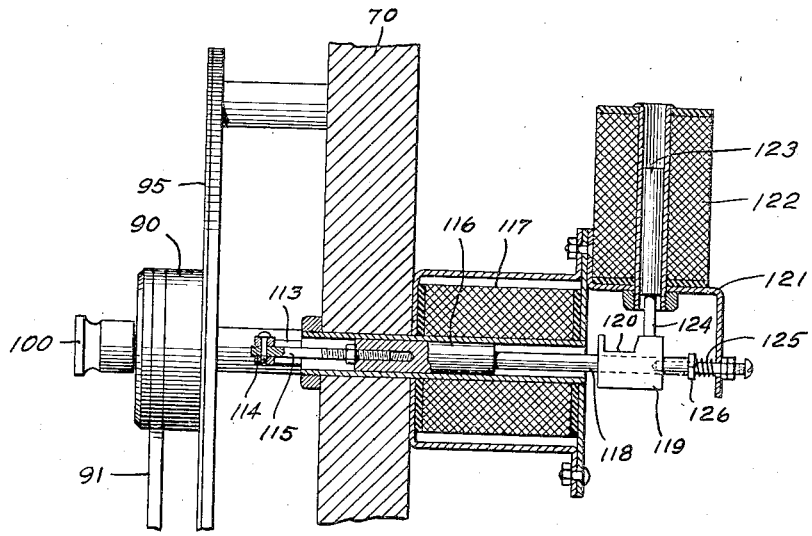
Fig. 6 is a section of the control magnet for stopping and starting the mechanism of Fig. 1.

As soon as the starting gongs 5, 55, etc., are energized in turn, due to the operation of starting mechanism 6, the switch 199 for each car is moved to close its contact 201. A circuit is then traceable from the positive side of source 160, conductor 172, switch 199, contact 201, magnet 122, to the other side of source 160 over conductor 171. Plunger 123 is attracted, drawing member 124 out of engagement with slot 120, permitting plunger 116 of magnet 117 to release under pressure of spring 125, thus moving lever 110 out of engagement with projections 111 and 112 (see Figs. 5, 6 and 7). Thereupon brush holder 91 immediately starts rotating, and upon the upward movement of the car, brush 152 makes contact with the second floor segment of commutator strip 148, closing a circuit from conductor 172 through the contact of car controlled, revolving switch 161, feed strip 154, brush 152, second floor segment of strip 148, conductor 157, upper middle contact of switch 159, conductor 163, one group of eight magnets 61 in series to conductor 171, over conductor 169, and through resistance 202. Armature 63 is thus stepped one step, carrying commutator 80 with it. Every time brush 152 contacts with a segment of commutator strip 148, armature 63 is stepped one step, and if the car is running according to the schedule speed, the steps will come sufficiently close together to drive commutator 80 at substantially the same speed as brush arm 91. Brush 93 will therefore remain in contact with segment 96, and no indications are given.

As soon as the car leaves the ground floor, cam 137 closes contacts 138 and the circuit for starting signal 5 which, it will be remembered, has been ringing, is broken at contact 45, due to the fact that restore magnet 43 is energized in a circuit traceable from the positive side of battery on conductors 133, winding of magnet 43, conductor 139, contacts 138, to the other side of battery over conductors 135 and 132. Lamp 136 is also extinguished as is lamp 57.

Whenever the car by advancing too rapidly drives commutator 80 so fast that segment 97 is brought into contact with brush 93, a circuit is completed from battery on conductor 133, conductor 178, feed ring 95, brush 92, holder 91, brush 93, segment 97, conductor 179, dividing at point 203 and extending to the positive side of battery through lamp 54 in car 1, over conductor 135 and through lamp 47, over conductor 141. Lamps 54 and 47 are illuminated so that both the operator of the car and the dispatcher are aware that the car is proceeding too fast.

If, on the other hand, the car has slowed up on its travel for any reason, commutator 80 will fall behind brushes 92 and 93, whereupon a circuit will be closed through brush 93 on segment 98, over conductor 180, in parallel, through dispatcher's lamp 48, over conductor 141, through car lamp 53, over conductor 135, and through release 51 over conductor 141 and thence through conductor 132 to the battery 131. Lamp 48 and 53 indicate that the car is running behind its schedule and relay 51, by opening at its contacts the circuits for passenger signal 52 in the car, permits the car to proceed directly on its trip without stopping to take on any more passengers. As soon as commutator 80 again assumes its normal relation with brush 93, the signals are restored.

As for the system as a whole, it is to be understood that the arrangement herein shown and described is merely illustrative in its nature, and the invention is not to be limited thereto except as defined in the appended claims.

What is claimed is:

1. In a scheduling device for an elevator car operable past a plurality of floors between two terminal floors, means for said car responsive to calls for service at said floors, means operable in accordance with a predetermined schedule to define the position at which the car should be, means operable in accordance with the actual position of said car, and means operable by both of said means to render said car means ineffective to respond to calls for service while the position at which said car should be is in advance of the actual position of said car.

2. In a scheduling device for an elevator car operable past a plurality of floors between two terminal floors, means for said car responsive to calls for service at said floors, means operable in accordance with a predetermined schedule to define the position at which said car should be, means operable in accordance with the actual position of said car and engageable by said first named means while the position at which said car should be is a predetermined distance in advance of the actual position of said car, and means operably responsive to said engagement to render the said car means ineffective to respond to calls for service.

3. In a scheduling device for an elevator car operable through a predetermined cycle past a plurality of floors between two terminal floors, means for said car responsive to calls for service at said floors, means operable through a predetermined cycle proportional to said car cycle at a rate proportional to the rate at which said car should operate to define the position at which said car should be, means operable through a predetermined cycle proportional to said car cycle at a rate proportional to the rate at which said car operates through said car cycle and engaged by said first named means when the position at which said car should be differs from the actual position of said car by a predetermined amount, and means operably responsive to said engagement when the position at which said car should be is a predetermined distance in advance of the actual position of said car to render the said car means ineffective to respond to said calls for service, and operably responsive when the position at which said car should be is a lesser predetermined distance in advance of the actual position of said car to restore the said car means to a condition of effectiveness for responding to said calls for service.

4. In a scheduling device for an elevator car operable past a plurality of floors between two terminal floors, means for said car responsive to calls for service at said floor, comparative position indicating means for said car, means operable in accordance with a predetermined schedule to define the position at which said car should be, means operable in accordance with the actual position of said car, and means operable by both of said operable means for actuating said comparative position indicating means for said car, and for rendering said car means ineffective to respond to calls for service while the position at which said car should be is in advance of the actual position of said car.

5. In a scheduling device for an elevator car operable past a plurality of floors between two terminal floors, means for said car responsive to calls for service at said floor, means operable in accordance with a predetermined schedule to define the position at which said car should be, means operable in accordance with the actual position of said car, and means operable by both of said two means to render the said car means ineffective to respond to calls for service while the position at which the car should be is in advance of the actual position of said car.

6. In a scheduling device for an elevator car operable past a plurality of floors, means for said car responsive to calls for service at said floors, means operable in accordance with a predetermined schedule to define the position at which said car should be, means operable in accordance with the actual position of said car, and means operable by both of said two means to render the said car means ineffective to respond to calls for service when the position at which said car should be is a predetermined distance in advance of the actual position of said car, and for restoring said car means to effectiveness for responding to calls for service when the position at which the said car should be is a lesser predetermined distance in advance of the actual position of said car.

HARRY R. NORTON.